United States Patent [19]

Ratzel et al.

[11] 3,919,612
[45] Nov. 11, 1975

[54] INTERVAL WINDSHIELD WIPER ARRANGEMENT

[75] Inventors: Rudiger Ratzel, Buhl; Helmut Steinmann, Baden-Baden, both of Germany

[73] Assignee: Robert Bosch G.m.b.H., Stuttgart, Germany

[22] Filed: Mar. 22, 1974

[21] Appl. No.: 453,981

[30] Foreign Application Priority Data

May 18, 1973 Germany............................ 2325255

[52] U.S. Cl. ............ 318/DIG. 2; 318/443; 318/472
[51] Int. Cl.²................................................ H02P 1/04
[58] Field of Search ........ 318/443, DIG. 2, 471, 472

[56] References Cited
UNITED STATES PATENTS

| | | | |
|---|---|---|---|
| 3,497,790 | 2/1970 | Tixier............................ | 318/472 X |
| 3,564,375 | 2/1971 | Allaria............................ | 318/443 |
| 3,603,858 | 9/1971 | Ugo............................... | 318/443 |
| 3,716,766 | 2/1973 | Suzuki........................... | 318/443 X |
| 3,793,577 | 2/1974 | Moren............................ | 318/443 X |

*Primary Examiner*—B. Dobeck
*Attorney, Agent, or Firm*—Michael S. Striker

[57] ABSTRACT

The arrangement includes a windshield wiper drive motor and a source of electrical energy. A relay includes a relay winding connected to the source for energization thereby and includes an associated relay switch operative when the relay winding becomes energized for connecting the motor to the source to initiate motor operation. A temperature-dependent blocking unit is operative when above a predetermined temperature for preventing energization of the relay winding, and is operative when below a predetermined temperature for permitting energization of the relay winding. A wiper-position-dependent switch arrangement is operative when the wiper leaves a predetermined end position thereof for deenergizing the relay winding and establishing a heating current path for the flow of a heating current to heat up the blocking unit, and is operative when the wiper reaches the end position thereof for interrupting the heating current path so as to initiate cooling of the blocking unit. Thus the wiper remains in the end position while the blocking unit cools down. After elapse of a sufficient cooling time interval, the blocking means reassumes a temperature sufficiently low to permit renewed energization of the relay winding, and accordingly renewed operation of the wiper drive motor.

6 Claims, 4 Drawing Figures

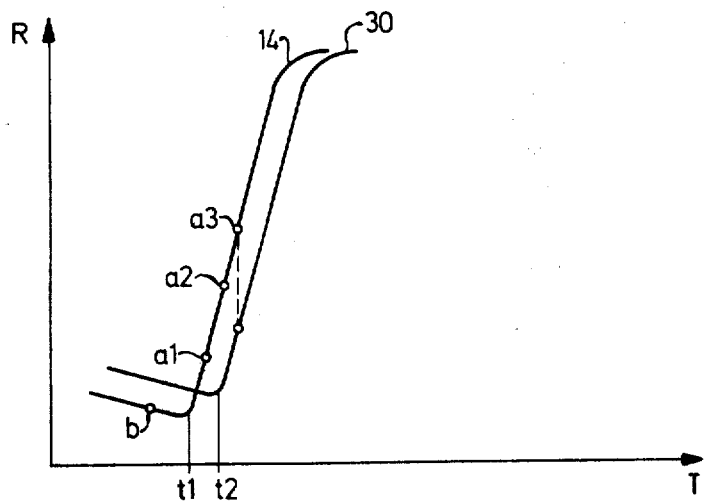
Fig. 3
Fig. 4
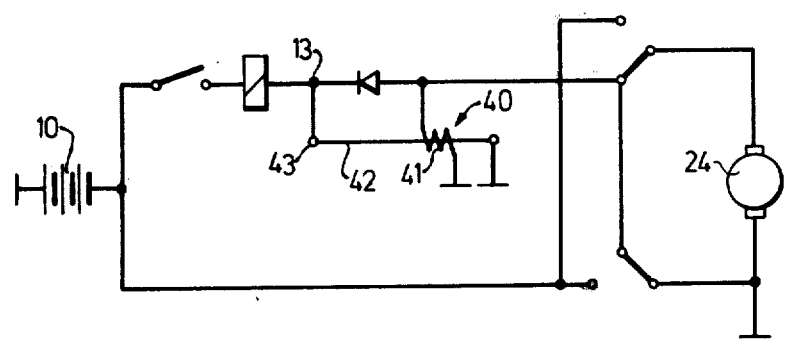

INTERVAL WINDSHIELD WIPER ARRANGEMENT

BACKGROUND OF THE INVENTION

The present invention relates to so-called interval windshield wiper arrangements. This type of windshield wiper arrangement can be set for intermittent operation, so that the windshield wiper will perform one complete operating cycle and then dwell in its end position for a predetermined time period before performing another complete operating cycle. Such operation is appropriate, for example, in cases of very light drizzle.

More particularly, the invention relates to an electric circuit arrangement for the intermittent driving of an interval windshield wiper provided with a drive motor and an end position switch. The end position switch is comprised of a moving switch member movable in dependence upon wiper position to either close a braking current path for the windshield wiper drive motor or else to close an energizing current path for the windshield wiper drive motor. A relay is comprised of a relay winding having one terminal connectable to a voltage source by means of a circuit-closing switch, with a temperature-dependent control element being provided in the current path of the relay winding, the control element permitting energization of the relay winding only when the control element is in cooled condition. Cooling of the temperature-dependent control element begins when the moving switch member of the end position switch returns to its normal position.

A known arrangement of this type employs for the control element an externally heated bimetallic switch, the heating coil of which has one terminal connected to ground and another terminal connected to the moving switch member of the end position switch. The bimetallic switch is so designed that only when the switch is cool can the relay winding become energized. As soon as the relay winding is energized, a relay switch closes a current path for the heating coil, so that the temperature of the bimetallic switch rises. Current is kept flowing through the heating coil by the moving switch member of the end position switch, even after the relay winding has become deenergized, until the wiper has assumed its end position.

A disadvantage of this known circuit arrangement is that the relay winding must be deenergized by means of the bimetallic switch. If the voltage supply is too low, or if the ambient temperature is very low, it can happen with the known circuit arrangement that the bimetallic switch has not yet interrupted the relay winding current path by the time the wiper first reaches its end position. The wiper may perform two or even more wiping movements before the desired pause in its operation occurs. However, with only a small amount of water on the windshield, precisely this is to be avoided, inasmuch as it involves completely unnecessary wear of the wiper. On the other hand, if the ambient temperature is very high, it can happen that the bimetallic switch will interrupt the relay winding current path before the end position switch has been activated. This would be the case in particular if the wiper moves only slowly out of its end position under conditions of very dry windshield on account of the large frictional force. With the known circuit arrangement, in such a case the relay winding would become deenergized too soon, causing the wiper drive motor to stop to soon.

SUMMARY OF THE INVENTION

It is a general object of the invention to provide an arrangement not characterized by the shortcomings described above.

It is another object to provide an arrangement of the type in question which avoids the possibility of too early a deenergization of the relay winding and with which the wiper can be made to perform no more than a single wiping cycle in between successive pauses in its operation.

This object, and others which will become more understandable from the following description of specific embodiments, can be met, according to one advantageous concept of the invention by providing, in an interval windshield wiper arrangement, in combination, a windshield wiper drive motor and a source of electrical energy. Further provided is a relay comprised of a relay winding connected to said source for energization thereby, and further comprised of an associated relay switch operative when the relay winding becomes energized for connecting the drive motor to the source to initiate motor operation. Also provided is temperature-dependent blocking means operative when above a predetermined temperature for preventing energization of the relay winding, and operative when below a predetermined temperature for permitting energization of the relay winding. A wiper-position-dependent switch means is operative when the wiper leaves a predetermined end position thereof for deenergizing the winding and establishing a heating current path for the flow of a heating current to heat up the blocking means, and is operative when the wiper reaches said end position for interrupting such heating current path to initiate cooling of the blocking means. Thus, the wipre remains in the end position thereof while the blocking means cools down. After elapse of a sufficient cooling time interval, the blocking means reassumes a temperature sufficiently low to permit renewed energization of the relay winding, and accordingly renewed operation of the wiper drive motor.

One of the chief advantages of the known construction is that when the relay winding is energized, to cause the wiper to leave the end position thereof, the relay winding is then deenergized under the control of a wiper-position-dependent switch arrangement. This is in contrast to the prior-art expedient, according to which such deenergizing of the relay winding was under the control of the temperature-dependent blocking means. This difference is important, on the one hand, because this way the relay winding cannot be deenergized until after the wiper has in fact left its end position and, on the other hand, because the relay winding is sure to be unenergized when the wiper again reaches its end position.

The invention contemplates, as a particularly advantageous way of deenergizing the relay winding when the wiper leaves the end position thereof, to have the wiper-position-dependent switch means connect the second terminal of the relay winding to a voltage so high that the voltage on the first terminal of the relay winding, which first terminal is connected to the electrical source, is not sufficiently higher than the second voltage to maintain the relay in energized condition.

For the temperature-dependent blocking means use can be made, for example, of a positive-temperature-coefficient resistor connected in the current path of the relay winding. Increasing temperature produces a sudden increase of the resistance of such a PTC-resistor, which is most advantageous for reliable operation of the circuit arrangement. When the PTC-resistor is in cooled condition, its resistance value should be just enough to ensure that the current flowing through it and through the relay winding is of a magnitude large enough to energize or pull in the relay. However, in heated condition, the resistance value of the PTC-resistor should be large enough that the relay winding cannot become immediately energized the moment the wiper returns to the end position and the wiper-dependent-switch means interrupts the heating current path of the blocking means. In other words, there should be a substantial time required for the PTC-resistor to cool down to a resistance value permitting renewed relay pull-in.

Instead of a PTC-resistor, use can be made of other elements, such as temperature-dependent resistors the conductivity of which changes suddenly in response to temperature changes. Also, use can be made of a bimetallic switch arrangement. However, from the standpoint of extreme simplicity, compactness and reliability of operation, a PTC-resistor element is preferred.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a graph depicting certain characteristics of the embodiment depicted in FIG. 2; and FIG. 4 depicts a third embodiment of the invention.

DESCRIPTION OF THE PREFERRED EMBODIMENTS

Figure 1:
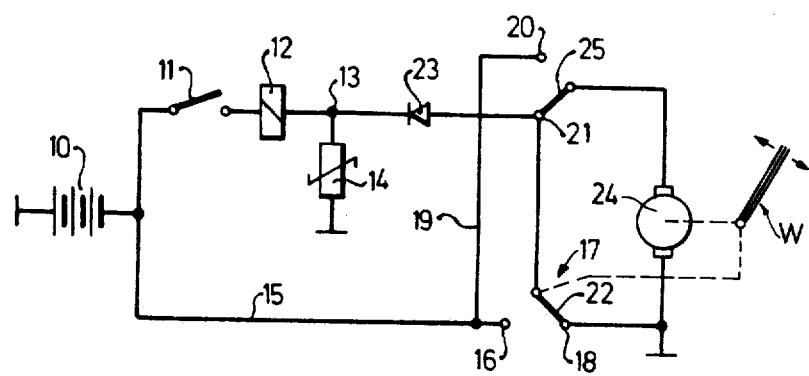
FIG. 1 depicts a first embodiment of the invention.

Discussing firstly the embodiment shown in FIG. 1, it is noted that reference numeral 10 designates a voltage source and reference numeral 11 a circuit closer switch. One terminal of relay winding 12 is connected to one terminal of switch 11, while the other terminal of relay winding 12 is connected to a circuit junction 13. A control element, in the form of a PTC-resistor 14 is connected between circuit junction 13 and ground.

The positive terminal of the voltage source 10 is connected via conductor 15 to the work contact 16 of a wiper-position-dependent switch generally designated 17. The switch 17 is comprised of two stationary contacts 16, 18 and of a moving switch member 22. The stationary rest contact 18 is connected to ground. A conductor 19 branches off from conductor 15 and leads to a first stationary contact 20 of a second two-position switch 20, 21, 25. This second two-position switch 20, 21, 25 is comprised of two stationary contacts 20, 21 and of a moving switch member 25. Moving switch member 25 is a relay switch controlled by relay winding 12. When relay winding 12 is unenergized, switch member 25 is in its illustrated position, in electrical engagement with contact 21; when relay winding 12 is energized, switch member 25 moves to its unillustrated position, in electrical engagement with contact 20. The moving switch member 22 of end-position switch 17 is permanently connected to the stationary contact 21 of the relay switch. Also connected to contact 21 is the anode of diode 23, the cathode of which is connected to circuit junction 13. The drive motor 24 has one terminal permanently connected to the moving switch member 25 and another terminal connected to ground.

The circuit of FIG. 1 operates as follows:

Circuit closing switch 11 is closed, and current from voltage source 10 flows through the relay winding 12 and through the PTC-resistor 14 to ground. Since the resistance value of the control element 14 when in cold condition is very small, the magnitude of this current will be large enough to energize relay winding 12, to cause the latter to move switch member 25 to its non-illustrated position in which it connects the drive motor 24 to the voltage source 10 via the conductors 15 and 19. Although at this stage in the operation the switch member 22 of the end position switch 17 is still in electrical engagement with the grounded contact 18, the relay winding 12 is not grounded, because of the voltage drop across the reverse-biased diode 23. Accordingly, the current flowing through relay winding 12 flows to ground exclusively through the PTC-resistor 14.

When the motor starts to turn, moving the windshield wiper W from the end position thereof, the switch member 22 moves into electrical engagement with stationary contact 16. As a result, the voltage at the positive terminal of voltage source 10 is applied to circuit junction 13, via conductor 15, contact 16, switch means 22, contact 21 and diode 23. As a result, the voltages on the two terminals of the relay winding 12 will be approximately equal, and the relay winding 12 will become deenergized. This causes the switch member 25 to reassume its illustrated position, the flow of motor current being maintained, via conductor 19, contact 16, switch member 22, contact 21 and switch member 25. The voltage drop across the now forward-biased diode 23 should be smaller than the voltage drop required across the relay winding 12 to maintain the same activated, in order to assure that the relay winding 12 becomes deenergized.

During continued operation of the drive motor, the current not flowing to ground through PTC-resistor 14, via conductor 15, contact 16, switch member 22 and diode 23, is substantially larger than the current which previously flowed therethrough when current flowed from winding 12 to ground via resistor 14; this is because the ohmic resistance of relay winding 12 is now not present in the current path of PTC-resistor 14. Accordingly, the temperature of control element 14 and therefore its resistance value rise quickly.

As soon as the windshield wiper has reached its end position, the switch member 22 of the end position switch 17 returns to its illustrated position and thereby short-circuits the drive motor 24. Simultaneously, the quickened heating of PTC-resistor 14 ends, since there is no longer a high voltage on the circuit junction 13. However, it is important to note that at this point in the circuit operation the resistance value of control element 14 has so greatly increased that the current flowing therethrough to ground from relay winding 12 is no longer of sufficient magnitude to energize winding 12 to an extent moving switch member 25 to its non-illustrated position. Energization of winding 12 to an extent moving switch member 25 to its non-illustrated position can only occur when the resistance value of the control element 14 has decreased.

Accordingly, cooling down of the control element 14 does not commence until the windshield wiper has reassumed its end position. In this way, it is assured that a pause in the operation of the wiper will occur each time the wiper has reassumed its end position. The possibility of the wiper performing a plurality of wiping cycles between successive pauses in its operation is accordingly positively excluded.

Furthermore, the relay cannot become deenergized before the wiper has moved out of its end position, because a voltage sufficient to deenergize the relay is applied to circuit junction 13, via diode 23, only when the switch member 22 engages the contact 16, and this occurs only after the wiper has left its end position.

Figure 2:
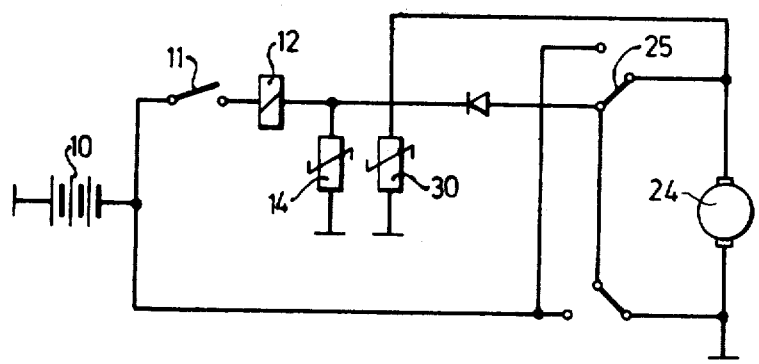
FIG. 2 depicts a second embodiment of the invention.

FIG. 2 depicts another embodiment according to the invention. The difference relative to the embodiment of FIG. 1 resides in the provision of a second PTC-resistor 30 having one terminal connected to ground and another terminal connected to the ungrounded terminal of the drive motor, and also connected to the switch member 25 associated with relay winding 12. This second PTC-resistor 30 has a higher threshold temperature than the control element 14 and is arranged in thermal contact with the latter. The advantage of this is explained with reference to FIG. 3.

FIG. 3 depicts the temperature dependence of the resistance value of the PTC-resistor 14 and 30. It will be noticed that the PTC-resistor 30 has a threshold temperature t2 greater than the threshold temperature t1 of PTC-resistor 14. From the graph it will be seen that the operating point of resistor 14 in warm condition is in the range between the points a1 and a2 whereas, in contrast, in cold condition the operating point is leftwards of the threshold temperature t1, at about the point b. The exact operating point in the region between a1 and a2 depends upon the magnitude of the voltage supply and upon the ambient temperature. During cooling, the operating point travels along the illustrated curve to the point b and it will be appreciated that a fluctuating temperature or a fluctuating voltage supply can result to a certain extent in variations in the required cooling time.

This disadvantage is avoided with the arrangement of FIG. 2. The resistance value of the PTC-resistor 14 becomes dependent upon the temperature of the second PTC-resistor 30. In heated condition the control element 14 assumes the operating point a3 and temperature fluctuations will no longer have so marked an effect.

FIG. 4 depicts a third embodiment. Here, the control element is a bimetallic switch generally designated by reference numeral 40. The heating coil 41 has one terminal connected to ground and another terminal connected to the anode of diode 23. The switch element 42 of the bimetallic switch 40 has one terminal connected to ground and moves into and out of electrical engagement with stationary contact 43, which in turn is connected to circuit junction 13. In heated condition, the bimetallic switch opens, interrupting the current path of the relay winding, so as to preclude energization thereof.

The embodiment of FIG. 4 operates similarly to the embodiments of FIGS. 1 and 2. When the arrangement is turned on, the bimetallic switch member 42 is in engagement with contact 41, and accordingly the current path of the relay winding is closed, and the motor 24 is energized. As soon as the windshield wiper moves out from its end position, the switch member 22 moves to its nonillustrated position, applying to the right-hand terminal of the relay winding a positive voltage, resulting in deenergization of the relay winding. At the same time, heating current flows through the heating coil 41, and the bimetallic switch member 42 will move out of engagement with contact 43. The heating-up of the bimetallic switch lasts until the wiper has reassumed its end position at the end of its wiping movement. Then the bimetallic switch cools down and finally reestablishes the relay winding current path.

In all three of the disclosed embodiments, it is important that the relay winding be directly deenergized by means of the moving switch member of the end portion switch and accordingly the turn-on impulse will be practically synchronized with the motor. This guarantees that the windshield wiper will be moved out of its end position and perform only one wiping movement in between each pause, even when the windshield is very dry.

It will be understood that each of the elements described above, or two or more together, may also find a useful application in other types of circuits and construction differing from the types described above.

While the invention has been illustrated and described as embodied in an interval windshield wiper arrangement, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention and, therefore, such adaptations should and are intended to be comprehened within the meaning and range of equivalence of the following claims.

What is claimed as new and desired to be protected by Letters Patent is set forth in the appended claims:

1. In an interval windshield wiper arrangement, in combination, a windshield wiper drive motor; a source of electrical energy; a relay comprised of a relay winding having one terminal connected to said source for energization thereby and to be maintained thereby at a first predetermined potential a second terminal and including an associated relay switch operative when said winding becomes energized for connecting said motor to said source to initiate motor operation; temperature-dependent blocking means connected to said second terminal and operative when above a predetermined temperature for preventing energization of said winding and operative when below a predetermined temperature for permitting energization of said winding; and wiper-position-dependent switch means including means operative when the wiper leaves a predetermined end position thereof for applying to said second terminal of said relay winding a potential such that the voltage drop across said relay winding will become sufficient to maintain said relay winding energized, and for establishing a heating current path for the flow of a heating current to heat up said blocking means, and operative when the wiper reaches said end position for interrupting said heating current path to initiate cooling of said blocking means, whereby after elapse of a sufficient cooling time interval the blocking means reassumes a temperature permitting renewed energization of said relay winding, said wiper position-dependent switch means comprising means operative when the wiper reaches said end position for establishing a braking current path for the flow of braking current out of said motor.

2. An arrangement as defined in claim 1, wherein said temperature-dependent blocking means is connected in the current path of said relay winding.

3. In an interval windshield wiper arrangement, in combination, a windshield wiper drive motor; a source of electrical energy; a relay comprised of a relay winding connected to said source for energization thereby and comprised of an associated relay switch operative when said winding becomes energized for connecting said motor to said source to initiate motor operation; temperature-dependent blocking means including a positive-temperature-coefficient resistor connected in the current path of said relay winding, said blocking means being operative when above a predetermined temperature for preventing energization of said winding and operative when below a predetermined temperature for permitting energization of said winding; and wiper-position-dependent switch means operative when the wiper leaves a predetermined end position thereof for deenergizing said winding and establishing a heating current path for the flow of a heating current to heat up said blocking means, and operative when the wiper reaches said end position for interrupting said heating current path to initiate cooling of said blocking means, whereby after elapse of a sufficient cooling time interval the blocking means reassumes a temperature permitting renewed energization of said relay winding.

4. An arrangement as defined in claim 3, wherein said wiper-position-dependent switch means comprises a two-position switch comprised of a work contact connected to said source to be maintained at a predetermined potential thereby, a rest contact connected to said motor, and a wiper-position-dependent switch member which electrically engages said rest contact when the wiper is in the end position thereof and which electrically engages said work contact when the wiper leaves the end position thereof, and wherein said wiper-position-dependent switch member is electrically connected to said second terminal of said relay winding.

5. An arrangement as defined in claim 4, further including a diode, said wiper-position-dependent switch member being electrically connected to said second terminal of said relay winding by said diode.

6. An arrangement as defined in claim 3, wherein said drive motor has two motor terminals one of which is connected to ground and the other of which is connectable via said relay switch to said source, and wherein said positive-temperature-coefficient resistor has one terminal connected to said second terminal of said relay winding and an other terminal connected to ground, and wherein said blocking means further includes an additional positive-temperature coefficient resistor having one terminal connected to ground and another terminal connected to said one of said two motor terminals, said positive-temperature-coefficient resistors being in heat-exchanging relationship with each other, and said additional positive-temperature coefficient resistor having a higher threshold temperature than the other of said resistors.

* * * * *